United States Patent
Hibi et al.

(10) Patent No.: US 12,039,746 B2
(45) Date of Patent: Jul. 16, 2024

(54) INFORMATION PROCESSING DEVICE AND INFORMATION PROCESSING METHOD FOR EXTRACTING INFORMATION FROM AN IMAGE

(71) Applicant: SONY GROUP CORPORATION, Tokyo (JP)

(72) Inventors: Hirofumi Hibi, Tokyo (JP); Hiroyuki Morisaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 379 days.

(21) Appl. No.: 17/440,867

(22) PCT Filed: Mar. 5, 2020

(86) PCT No.: PCT/JP2020/009291
§ 371 (c)(1),
(2) Date: Sep. 20, 2021

(87) PCT Pub. No.: WO2020/195657
PCT Pub. Date: Oct. 1, 2020

(65) Prior Publication Data
US 2022/0164974 A1    May 26, 2022

(30) Foreign Application Priority Data
Mar. 28, 2019   (JP) ................. 2019-062405

(51) Int. Cl.
*G06T 7/55* (2017.01)
*G06Q 30/0241* (2023.01)
(Continued)

(52) U.S. Cl.
CPC ........... *G06T 7/55* (2017.01); *G06Q 30/0241* (2013.01); *G06T 7/11* (2017.01); *G06V 10/247* (2022.01);
(Continued)

(58) Field of Classification Search
CPC ......... G06T 7/55; G06T 7/11; G06T 2200/24; G06T 11/60; G06Q 30/0241;
(Continued)

(56) References Cited

U.S. PATENT DOCUMENTS

2003/0012409 A1   1/2003  Overton et al.
2009/0123025 A1*  5/2009  Deng ................... G06V 20/40
                                                                725/60
(Continued)

FOREIGN PATENT DOCUMENTS

AT       394756 T      5/2008
AU    2001283437 B2    5/2007
(Continued)

OTHER PUBLICATIONS

Extended European Search Report of EP Application No. 20777580.0, dated Apr. 22, 2022, 10 pages.
(Continued)

*Primary Examiner* — Amandeep Saini
*Assistant Examiner* — Daniella M. DiGuglielmo
(74) *Attorney, Agent, or Firm* — CHIP LAW GROUP

(57) ABSTRACT

An information processing device includes: an acquisition unit configured to acquire setting information which is set based on a template image and associates an image region with analysis process content; and an image processing unit configured to perform an analysis process corresponding to the analysis process content associated with the image region on an image of a target region corresponding to the image region in an input image.

14 Claims, 23 Drawing Sheets

(51) Int. Cl.
*G06T 7/11* (2017.01)
*G06V 10/24* (2022.01)
*G06V 10/25* (2022.01)
*G06V 10/74* (2022.01)
*G06V 10/764* (2022.01)
*G06V 20/40* (2022.01)
*G06V 30/10* (2022.01)

(52) U.S. Cl.
CPC ............ *G06V 10/25* (2022.01); *G06V 10/761* (2022.01); *G06V 10/764* (2022.01); *G06V 20/46* (2022.01); *G06V 30/10* (2022.01); *G06T 2200/24* (2013.01)

(58) Field of Classification Search
CPC .... G06V 10/247; G06V 10/25; G06V 10/761; G06V 10/764; G06V 20/46; G06V 30/10
See application file for complete search history.

(56) References Cited

U.S. PATENT DOCUMENTS

| 2012/0062961 | A1 | 3/2012 | Yamaai |
| 2015/0116789 | A1 | 4/2015 | Xu |
| 2016/0119674 | A1 | 4/2016 | Ejima et al. |

FOREIGN PATENT DOCUMENTS

| BR | 117076 A | 8/2004 | |
| CA | 2454297 A1 | 1/2003 | |
| CN | 102402573 A | 4/2012 | |
| CN | 103477349 A * | 12/2013 | ........... G06K 9/3266 |
| CN | 103235956 B * | 5/2016 | |
| CN | 109343920 A * | 2/2019 | ............ G06F 9/451 |
| EP | 1405266 A2 | 4/2004 | |
| HK | 1064776 A1 | 2/2005 | |
| IL | 159788 A | 4/2010 | |
| JP | 2004-535129 A | 11/2004 | |
| JP | 2012-059226 A | 3/2012 | |
| JP | 2014-096154 A | 5/2014 | |
| JP | 2015-088011 A | 5/2015 | |
| MX | 04000307 A | 3/2005 | |
| WO | 2003/007245 A2 | 1/2003 | |
| WO | 2015/004840 A1 | 1/2015 | |
| WO | 2017/073344 A1 | 5/2017 | |

OTHER PUBLICATIONS

Clippingdale, et al., "Skin Region Extraction and Person-Independent Deformable Face Templates for Fast Video Indexing", IEEE, International Symposium on Multimedia, XP032090763, Dec. 5, 2011, pp. 416-421.

International Search Report and Written Opinion of PCT Application No. PCT/JP2020/009291, dated Apr. 14, 2020, 09 pages of ISRWO.

* cited by examiner

BROADCASTING CONTENT

TEMPLATE IMAGE

FIG. 9

| ID1<br>CATEGORY 1 | AA | AA | AA | AA | · · · · |
|---|---|---|---|---|---|
| ID2<br>CATEGORY 2 | AIR CONDITIONER BB | AIR CONDITIONER BB | AIR CONDITIONER BB | AIR CONDITIONER BB | · · · · |

INFORMATION PROCESSING DEVICE AND INFORMATION PROCESSING METHOD FOR EXTRACTING INFORMATION FROM AN IMAGE

CROSS REFERENCE TO RELATED APPLICATIONS

This application is a U.S. National Phase of International Patent Application No. PCT/JP2020/009291 filed on Mar. 5, 2020, which claims priority benefit of Japanese Patent Application No. JP 2019-062405 filed in the Japan Patent Office on Mar. 28, 2019. Each of the above-referenced applications is hereby incorporated herein by reference in its entirety.

TECHNICAL FIELD

The present disclosure relates to an information processing device, an information processing method, and a program.

BACKGROUND ART

In the related art, technologies for detecting predetermined objects in images have been proposed. For example, the following PTL 1 discloses a technology for detecting an object using learning through deep learning.

CITATION LIST

Patent Literature

[PTL 1]
WO 2017/073344

SUMMARY

Technical Problem

In the technology disclosed in PTL 1, there is a problem that the costs are high due to a process of performing learning every time.

An objective of the present disclosure is to provide an information processing device, an information processing method, and a program capable of extracting information in a predetermined image without performing learning.

Solution to Problem

The present disclosure is, for example, an information processing device including: an acquisition unit configured to acquire setting information which is set based on a template image and associates an image region with analysis process content; and an image processing unit configured to perform an analysis process corresponding to the analysis process content associated with the image region on an image of a target region corresponding to the image region in an input image.

The present disclosure is, for example, an information processing method including: acquiring, by an acquisition unit, setting information which is set based on a template image and associates an image region with analysis process content; and performing, by an image processing unit, an analysis process corresponding to the analysis process content associated with the image region on an image of a target region corresponding to the image region in an input image.

The present disclosure is, for example, a program causing a computer to perform an information processing method including:
acquiring, by an acquisition unit, setting information which is set based on a template image and associates an image region with analysis process content; and
performing, by an image processing unit, an analysis process corresponding to the analysis process content associated with the image region on an image of a target region corresponding to the image region in an input image.

BRIEF DESCRIPTION OF DRAWINGS

FIG. 9 is a diagram referred to when an exemplary operation of the information processing device is described according to the first embodiment. FIGS. 17A, 17B, 17C, 17D, 17E, 17F, 17G, 17H, 17I, 17J, 17K, and 17L are diagrams referred to when an exemplary operation of the information processing device is described according to the second embodiment. FIG. 19 is a diagram illustrating an example of display corresponding to display information according to the second embodiment.

DESCRIPTION OF EMBODIMENTS

Hereinafter, embodiments of the present disclosure will be described with reference to the drawings. The description will be made in the following order <First Embodiment>
<Second Embodiment>
<Modification examples>
<Application examples>

The embodiments to be described below are preferred specific examples of the present disclosure and content of the present disclosure is not limited to the embodiments.

First Embodiment

[Overview of First Embodiment]

Figure 1:
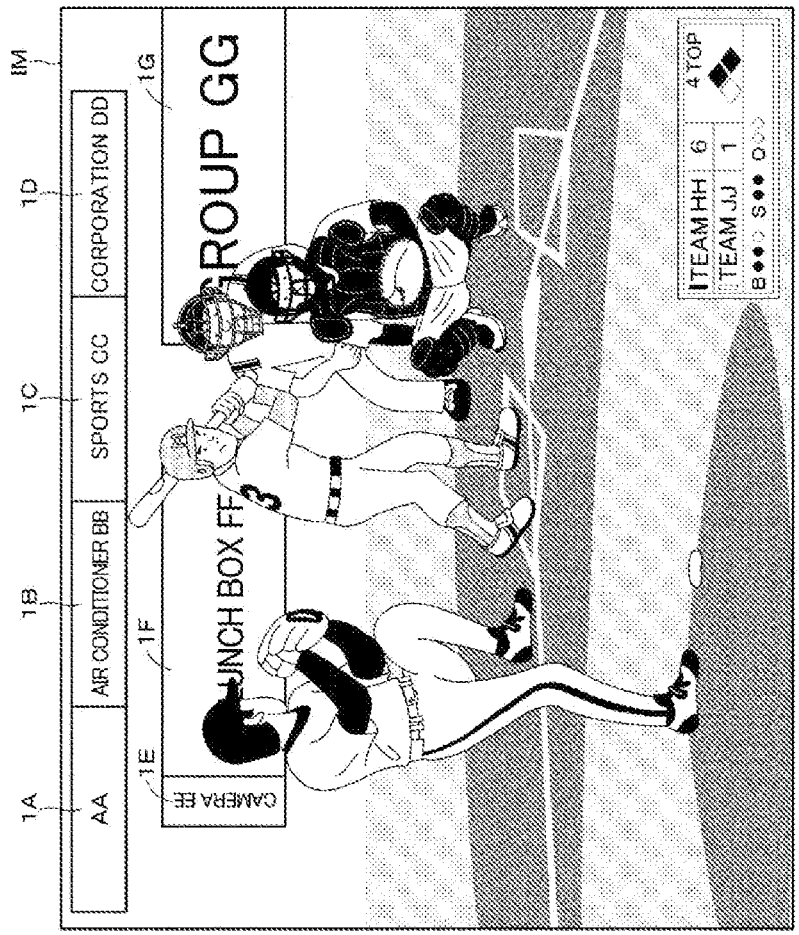
FIG. 1 is a diagram referred to when an overview of a first embodiment is described.

First, an overview of a first embodiment will be described with reference to FIG. 1. FIG. 1 illustrates one image IM in a video of baseball sport. The video of baseball which is one piece of content is, for example, a video broadcast by broadcasting or delivered via the Internet. As illustrated in FIG. 1, an advertisement is displayed on the content such as a video or the like of baseball. In the illustrated example, for example, an advertisement 1A called "AA", an advertisement 1B called "air conditioner BB", an advertisement 1C called "sports CC", an advertisement 1D called "Corporation DD", an advertisement 1E called "camera EE", and advertisement 1F called "lunch box FF", and an advertisement 1G called "group GG" are displayed. Such advertisements are displayed on a display installed in a predetermined position in a baseball stadium.

In general, an advertisement frame in which an advertisement is displayed is sold in accordance with a price determined by an installation place or the size of or the like of the display. However, since it is not clear how long an advertisement will be displayed for in one piece of baseball content, there is a problem that it is difficult for a purchaser of the advertisement frame to know how effective an advertisement has been. Accordingly, in a first embodiment, a value of a display portion of an advertisement is quantified, for example, by extracting the advertisement in a baseball video, specifically, a video from start to end of the baseball or a baseball video in a broadcasting time range, and calculating a time for which the advertisement is actually displayed. This process is performed through a relatively simple process without performing machine learning. Hereinafter, the first embodiment will be described in detail.

[Exemplary Configuration of Information Processing Device]

Figure 2:
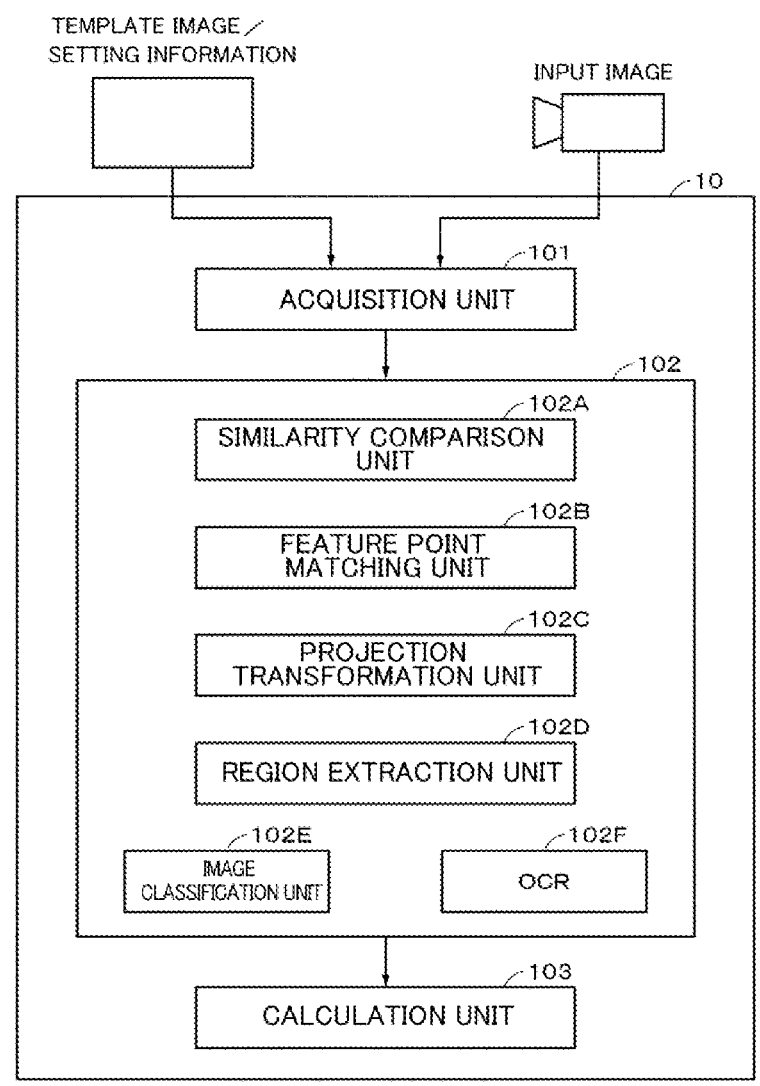
FIG. 2 is a block diagram illustrating an exemplary configuration of an information processing device according to the first embodiment.

FIG. 2 is a diagram illustrating an exemplary configuration of an information processing device (an information processing device 10) according to the first embodiment. The information processing device 10 includes an acquisition unit 101, an image processing unit 102, and a calculation unit 103. The image processing unit 102 functionally includes a similarity comparison unit 102A, a feature point matching unit 102B, a projection transformation unit 102C, a region extraction unit 102D, an image classification unit 102E, and an optical character recognition/reader (OCR) 102F.

The acquisition unit 101 acquires a template image, setting information, and an input image (hereinafter referred to as a template image or the like). The setting information is information that is set based on any template image and associates an image region with analysis process content. A specific configuration of the acquisition unit 101 can be a configuration appropriate in accordance with an aspect in which a template image or the like is acquired. When the template image or the like is stored in a memory embedded in the information processing device 10 or a memory detachably mounted on the information processing device 10, the acquisition unit 101 has a configuration for performing a reading process from such a memory. When the template image or the like is delivered via the Internet or broadcasting, the acquisition unit 101 has a configuration for communicating with a delivery source. The template image or the like acquired by the acquisition unit 101 is output to the image processing unit 102.

The image processing unit 102 performs an analysis process corresponding to the analysis process content associated with the image region on an image of a target region corresponding to the image region in the input image.

The similarity comparison unit 102A determines similarity between the template image and the input image. For example, the similarity comparison unit 102A detects a feature amount vector of each of both the images, compares the similarity between the template image and the input image based on a difference between the detected feature amount vectors, and determines the similarity.

When the similarity comparison unit 102A determines that the similarity between the template image and the input image is equal to or greater than a given value, the feature point matching unit 102B determines the similarity between the template image and the input image in detail. The feature point matching unit 102B determines the similarity between the template image and the input image in accordance with whether feature points corresponding to feature points included in the template image are included in the input image according to the number of values equal to or greater than thresholds. The thresholds are set as values with which the projection transformation unit 102C to be described below can perform projection transformation. That is, the feature point matching unit 102B determines whether the projection transformation can be performed on the input image. As specific example of the thresholds, six values are set to correspond to parameters in six dimensions defining a motion of a camera (a motion in the X axis direction, a motion in the Y axis direction, a motion in the Z axis direction, a rotational motion around the X axis (pitch), a rotational motion in the Y axis direction (roll), and a rotational motion in the Z axis (yaw)).

When the feature point matching unit 102B determines that the projection transformation can be performed, the projection transformation unit 102C performs the projection transformation so that an angle of view of the input image becomes the same as an angle of view of the template image. Through the process performed by the projection transformation unit 102C, the angle of view of the template image becomes the angle of view of the input image.

The region extraction unit 102D extracts (cuts out) the image of the target region corresponding to the image region set with the setting information in the input image. The extracted image is output. The analysis process corresponding to the analysis process content associated with the image region in the setting information is performed on the extracted image of the target region. The analysis process is an image classification process and a process of recognizing at least one of text and number (hereinafter appropriately referred to as a text recognition process). That is, when the analysis process content associated with the region of the extracted image is the image classification process, the region extraction unit 102D outputs the extracted image of the target region to the image classification unit 102E. When the analysis process content associated with the region of the extracted image of the target region is the text recognition process, the region extraction unit 102D outputs the extracted image to the OCR 102F.

The image classification unit 102E performs a process of classifying the images of the target region for each category.

Specifically, the image classification unit 102E determines the similarity between the image of the present target region and the image of the target region in the temporally previous input image and classifies the image of the present target region into a predetermined category in accordance with a determination result. More specifically, when the image of the present target region has similarity equal to or greater than a given value to the image of the target region in the temporally previous input image, the image classification unit 102E classifies the image of the present target region into the same category as the image. When the image of the present target region does not have similarity equal to or greater than a given value to the image of the target region in the temporally previous input image, the image classification unit 102E classifies the image of the present target region into a newly set category.

The OCR 102F performs the text recognition process on the image of the target region. The recognition process results of the OCR 102F are stored chronologically, for example.

The image processing unit 102 may generate display information in which a result of the analysis process by the image classification unit 102E or the OCR 102F is displayed along a time axis.

The calculation unit 103 performs calculation using the result of the process performed by the image processing unit 102. For example, the calculation unit 103 calculates a time in which a predetermined advertisement is displayed in one piece of baseball content.

The exemplary configuration of the information processing device 10 has been described above. The above-described configuration of the information processing device 10 is exemplary and another configuration may be appropriately added. For example, the information processing device 10 may include a control unit that performs general control or a memory that stores various kinds of information. The setting information may be input by the information processing device 10. In this case, the information processing device 10 may include an operation input unit (a keyboard, a touch panel, or the like) appropriate for inputting the setting information.

[Setting information]

Next, a specific example of the setting information will be described. Hereinafter, an image input at a predetermined period (for example, set to 1 second) is set as an input image in a video that configures baseball content which is broadcasting content in the following description.

Figure 3:
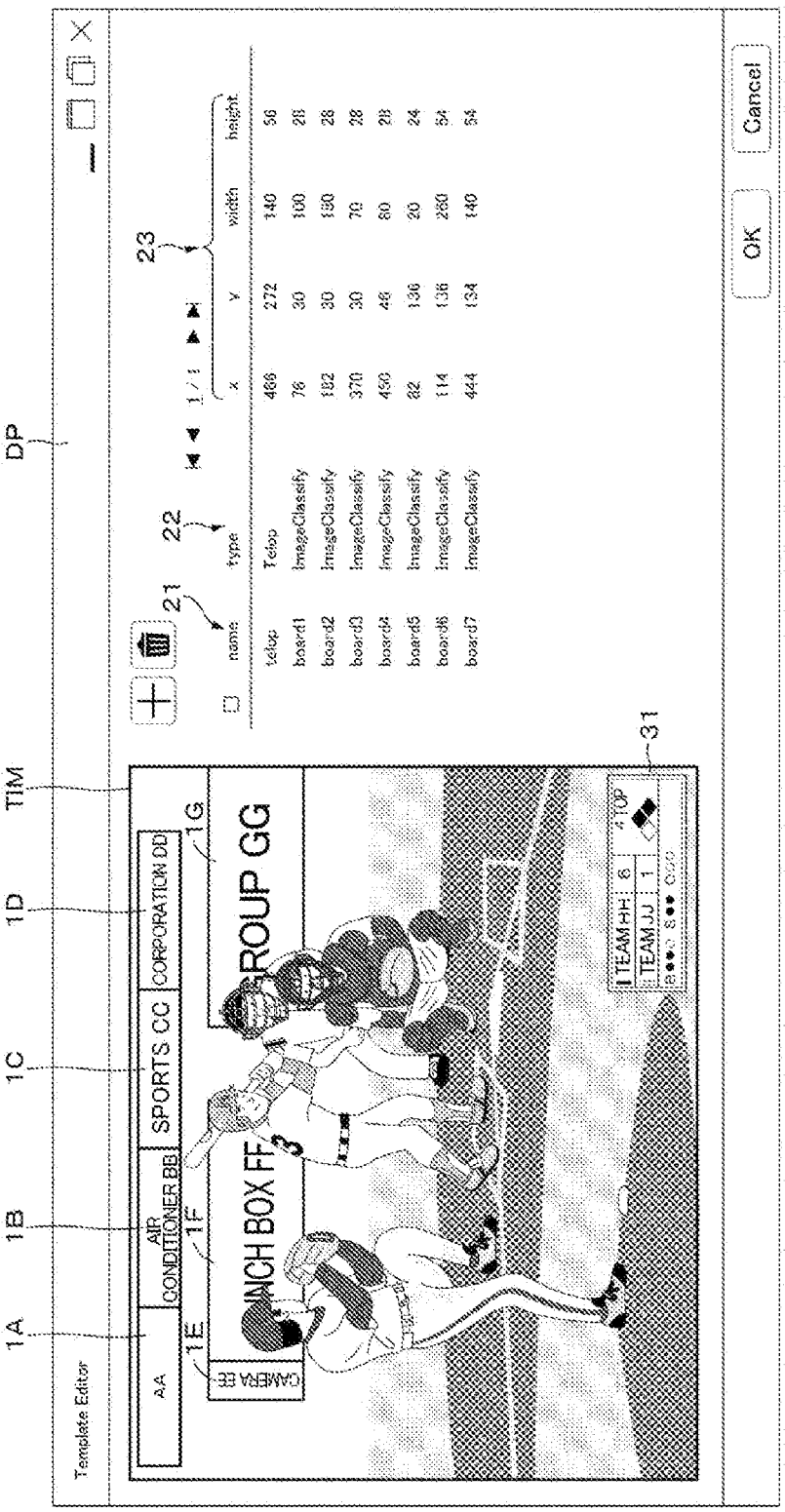
FIG. 3 is a diagram illustrating an example of a UI for inputting setting information using a template image according to the first embodiment.

FIG. 3 is a diagram illustrating an example of a user interface (UI) for inputting setting information using a template image. As described above, the setting information may be input to the information processing device 10 or may be input to another device different from the information processing device 10.

As illustrated in FIG. 3, a template image TIM is displayed to the left of a display DP. The template image TIM is, for example, an image of a baseball scene in which advertisements are displayed. The advertisements are, for example, the above-described advertisement 1A, advertisement 1B, advertisement 1C, advertisement 1D, advertisement 1E, advertisement 1F, and advertisement 1G. It is not necessary for a baseball game shown in the template image TIM to be the same as a baseball game in the input image, but it is necessary for the baseball game to be the same as a baseball game at the same baseball stadium, since display positions of the advertisements are different at a baseball stadium.

The setting information is input with reference to the template image TIM. The setting information includes, for example, name information 21, a type 22 corresponding to the analysis process content, and region information 23 associated with each other. The name information 21 is an arbitrarily set term. In this example, "telop" and "board1" to "board7" are set as the name information 21. The analysis process content is associated with each piece of name information. "Telop" is associated as the type 22 corresponding to "telop". The analysis process content "Telop" is a process of detecting a telop 31 included in the template image TIM in accordance with a known image recognition method.

"ImageClassify" is associated as the type 22 with "board1" to "board7". "ImageClassify" means that the image classification unit 102E is instructed to perform a process on the image of a region designated with the region information The region information 23 is information for designating a region in the template image TIM. As the region information 23, for example, a region in which an advertisement is displayed is designated. For example, "board1" is assumed to correspond to the advertisement 1A. As the region information 23 of "board1", a region in which the advertisement 1A is displayed, specifically, a region in which a width is "100" and a height is "28", is designated when a portion at an x coordinate of "76" and a y coordinate of "30" is the origin. "board2" to "board7" correspond to the advertisements 1B to 1G. For "board2" to "board7", regions in which the advertisements 1B to 1G are displayed are designated as the region information 23. In this way, in this example, seven pieces of setting information are input based on the template image TIM.

In a range in which imaging is performed at another angle, for example, an angle at which a batter standing in a batter's box is imaged in the front, there is a display or a fence in which an advertisement is displayed in some cases. In these cases, a template image at the same angle is prepared and the setting information is input based on the template image. That is, the number of template images may be plural. The setting information for each of the plurality of template images may be prepared and the processes based on the setting information may be performed in parallel.

[Exemplary Operation of Information Processing Device]

Figure 4A:
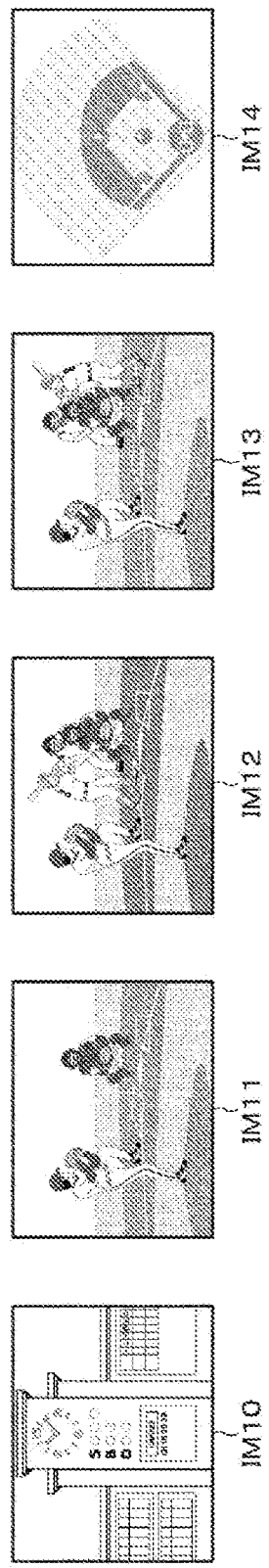
FIGS. 4A and 4B are diagrams referred to when an exemplary operation of the information processing device is described according to the first embodiment.
Figure 4B:
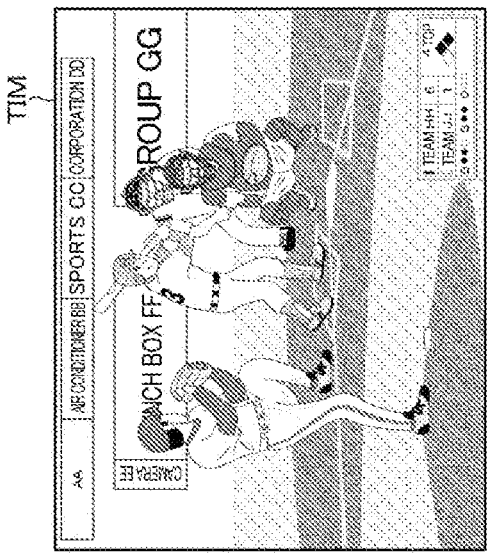

Next, an exemplary operation of the information processing device 10 will be described. As illustrated in FIG. 4A, the acquisition unit 101 of the information processing device 10 acquires the input images of the baseball content. For example, the input images (IM10 to IM14) of five frames are acquired every second. Since a broadcasting time of one piece of baseball content is actually about several hours, many input images are also acquired. Here, to facilitate description, five input images are used. FIG. 4B illustrates an example (the template image TIM) of the template image. The acquisition unit 101 acquires the setting information set based on the template image TIM. The template image TIM, the setting information corresponding to the template image TIM, and the input images are input to the image processing unit 102.

Figure 5A:
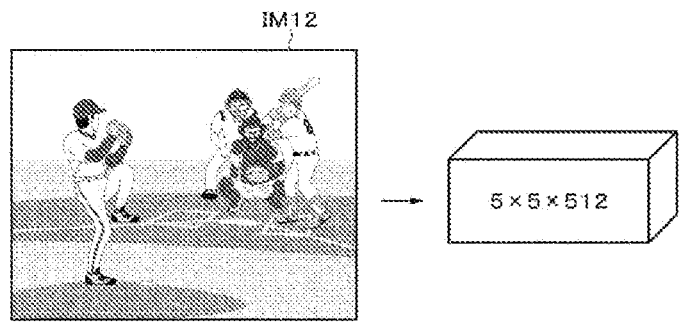
FIGS. 5A and 5B are diagrams referred to when an exemplary operation of the information processing device is described according to the first embodiment.
Figure 5B:
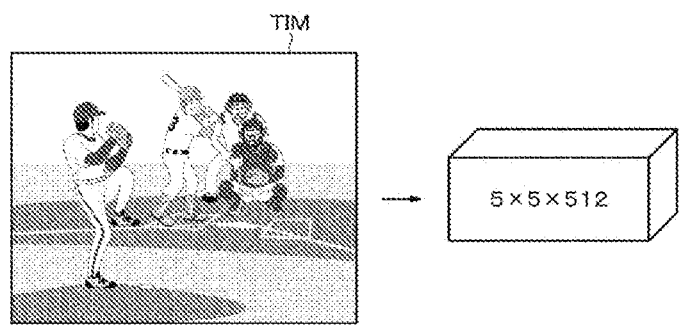

The similarity comparison unit 102A compares the similarity between the input image and the template image using the feature amount vectors to perform determination. As illustrated in FIG. 5A, the similarity comparison unit 102A detects, for example, 5×5×512 feature amount vectors as the feature amount vectors of the input image IM12 in accordance with a known method. A value of each feature amount vector indicates each of vertical, horizontal, and depth vectors (dimensions). As illustrated in FIG. 5B, the similarity comparison unit 102A detects 5×5×512 feature amount vectors similarly in the template image TIM.

Figure 6A:
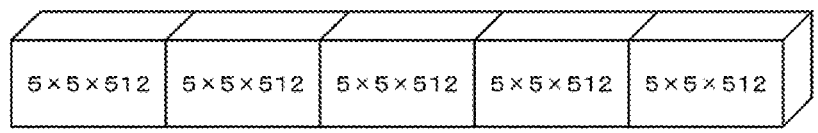
FIGS. 6A and 6B are diagrams referred to when an exemplary operation of the information processing device is described according to the first embodiment.
Figure 6B:
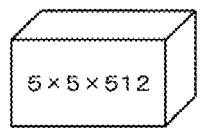

The feature amount vectors are detected in each input image. In this example, as schematically illustrated in FIG. 6A, the feature amount vectors of each of the five input images are detected. As schematically illustrated in FIG. 6B, the feature amount vectors of the template image TIM are detected.

The similarity comparison unit 102A calculates a difference between the feature amount vector of each input image and the feature amount vector of the template image TIM. Then, when the difference is equal to or less than a predetermined threshold, the similarity comparison unit 102A determines that the similarity between the input image and the template image TIM is equal to or greater than a given value and the images are similar. When the difference is greater than the predetermined threshold, the similarity comparison unit 102A determines that the similarity is less than the given value and the input image and the template image TIM are not similar. The similarity comparison unit 102A outputs a determination result to the feature point matching unit 102B.

Figure 7:
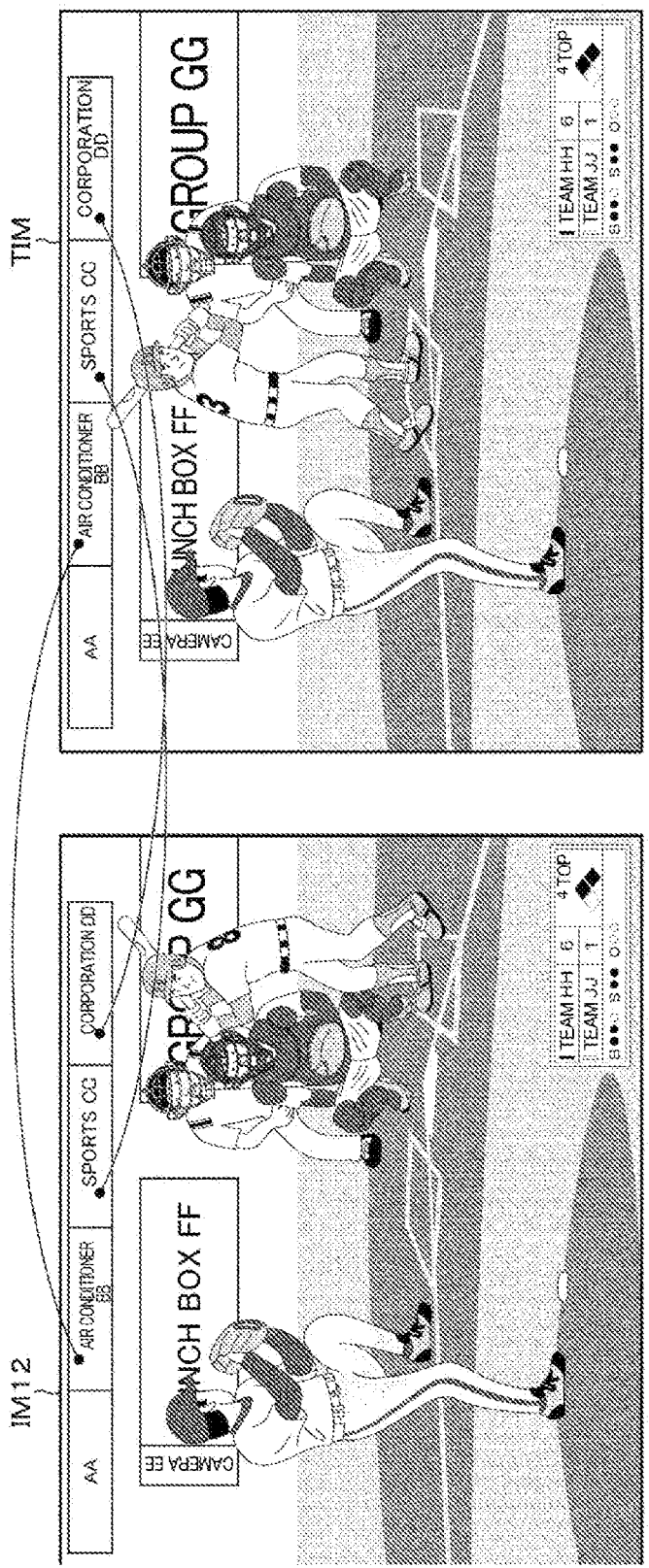
FIG. 7 is a diagram referred to when an exemplary operation of the information processing device is described according to the first embodiment.

The feature point matching unit 102B detects feature points. For example, when similarity between the feature points of two images (the template image TIM and the input image determined to be similar to the template image TIM by the similarity comparison unit 102A) is more distant than a second candidate, that is, the feature points are featured in the images, the feature point matching unit 102B extracts pairs of feature points, as illustrated in FIG. 7. When six or more pairs of feature points are extracted, the template image TIM is determined to be similar to the input image. As described above, the fact that the template image TIM is similar to the input image means that projection transformation is possible. The feature point matching unit 102B outputs a determination result to the projection transformation unit 102C.

Figure 8A:
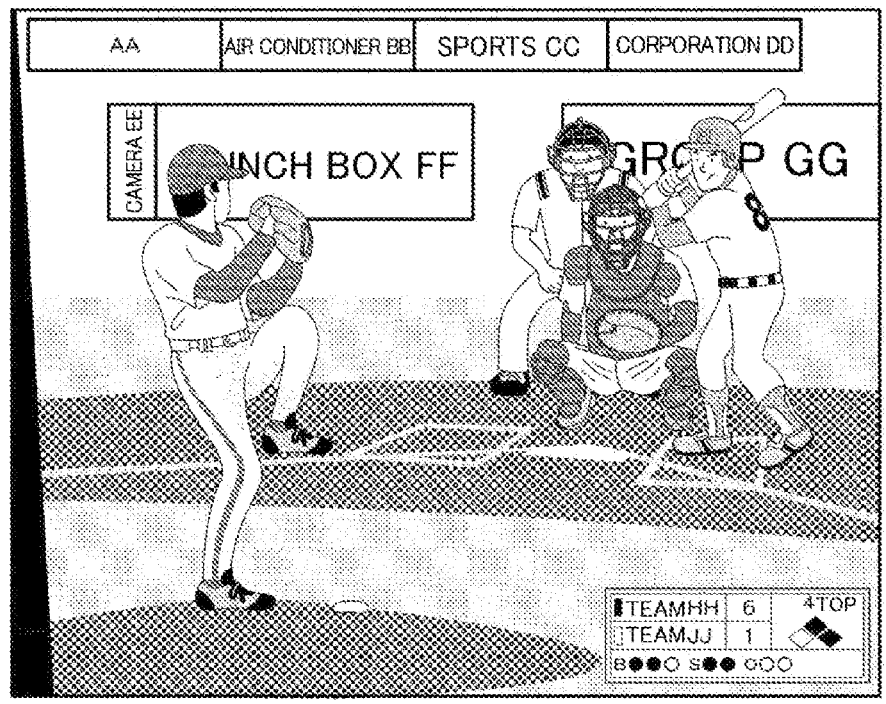
FIGS. 8A and 8B are diagrams referred to when an exemplary operation of the information processing device is described according to the first embodiment.
Figure 8B:
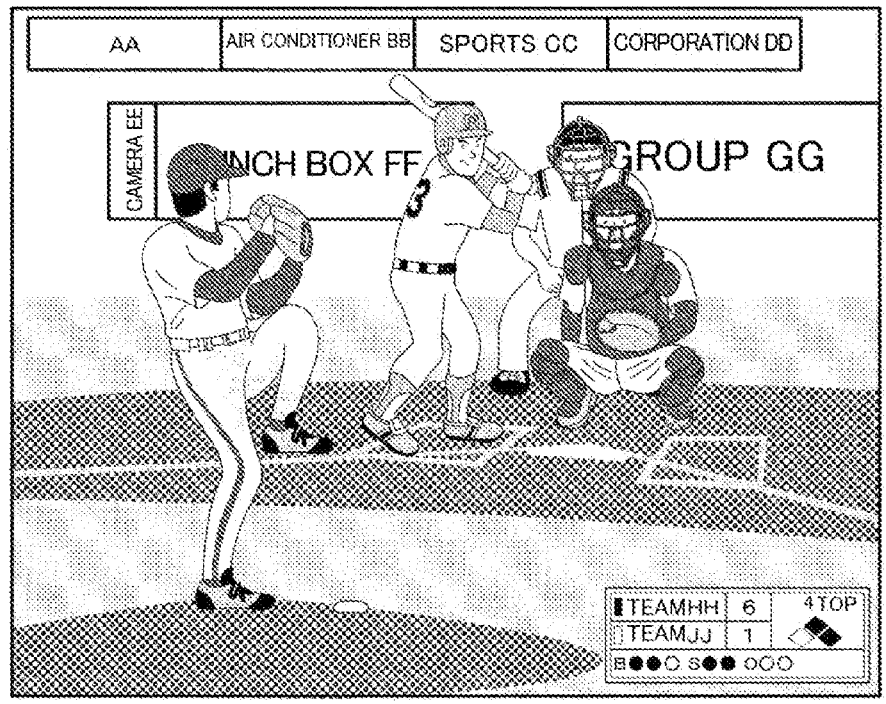

The projection transformation unit 102C performs projection transformation which is an example of alignment on the input image determined to be similar by the feature point matching unit 102B to align an angle of view of the input image with an angle of view of the template image TIM. FIG. 8A illustrates the input image IM12 subjected to the projection transformation. Due to the projection transformation, for example, a dark portion can occur to the left. By performing the projection transformation, the angle of view of the input image IM12 illustrated in FIG. 8A becomes the same as the angle of view of the template image TIM illustrated in FIG. 8B. Then, the projection transformation unit 102C outputs the input image subjected to the projection transformation to the region extraction unit 102D.

In the input image determined to be similar to the template image TIM by the similarity comparison unit 102A and the feature point matching unit 102B, there is a probability of the advertisements being displayed similarly to the template image TIM. The projection transformation unit 102C aligns the angle of view of the input image with the angle of view of the template image TIM. The region extraction unit 102D extracts a region designated with the region information 23 of the setting information from the input image subjected to the projection transformation.

For example, the region extraction unit 102D extracts an image based on the region information 23 corresponding to "board1". As the type 22 corresponding to "board1", a process of classifying the extracted image into the category is designated. Thus, the region extraction unit 102D outputs the cut image to the image classification unit 102E.

The image classification unit 102E performs the analysis process corresponding to the type 22 corresponding to "board1", that is, the process of classifying the extracted image into the category, on the image supplied from the region extraction unit 102D. The extracted image is, for example, an image corresponding to the advertisement 1A. Of course, the advertisement displayed in the region information 23 corresponding to "board1" is also likely to be changed to an advertisement different from the advertisement 1A over time. Thus, the image classification unit 102E determines similarity between the extracted image (hereinafter appropriately referred to as a present target image) and a temporally previous (past) extracted image (hereinafter appropriately referred to as a past target image). For example, the feature point matching unit 102B determines the similarity. However, the image classification unit 102E may perform a method similar to the determination method performed by the feature point matching unit 102B. The number of past target images can be singular or plural. In this case, the similarity between the present target image and each of the plurality of past target images is determined.

When the similarity between the present target image and the past target image is equal to or greater than the given value, the image classification unit 102E classifies the present target image into the same category as the past target image. When there is no past target image that has the similarity equal to or greater than the given value to the present target image, the image classification unit 102E sets a new category and classifies the present target image into the set category. The category is identified by an identifier (ID).

For example, an image corresponding to the advertisement 1A is assumed to be extracted as the first present target image by the region extraction unit 102D.

Since there is no past target image, category 1 is set as ID1. Subsequently, an image corresponding to the advertisement 1B is assumed to be extracted as another present target image from the same input image by the region extraction unit 102D. Since the image corresponding to the advertisement 1A is not similar to the image corresponding to the advertisement 1B, category 2 is newly set as ID2 and the image corresponding to the advertisement 1B is classified into category 2. As illustrated in FIG. 9, when the image corresponding to the advertisement 1A is extracted from the subsequent input image, the image is classified into category 1 by the image classification unit 102E and the image is added to category 1. When the images corresponding to the advertisement 1B and other advertisements are extracted, the images are also classified into a predetermined category in this way.

An exemplary operation of the information processing device 10 will be described with reference to the flowchart of FIG. 10. When the process starts, the similarity comparison unit 102A detects feature amount vectors of the template image and the feature amount vectors of the input image in step ST11. The feature amount vectors of the template image may be detected in each process, the feature amount vectors detected once may be stored and the feature amount vectors may be read in each process. The input image is input at a predetermined period (for example, 1 second). Then, the process proceeds to step ST12.

In step ST12, the similarity comparison unit 102A obtains a difference between the feature amount vector of the template image and the feature amount vector of the input image and determines the similarity in accordance with the difference. Specifically, when the difference is equal to or less than the threshold, the similarity comparison unit 102A determines that the template image is similar to the input image. When the difference is greater than the threshold, the similarity comparison unit 102A determines that the template image is not similar to the input image. Then, the process proceeds to step ST13.

In step ST13, a determination result of the similarity between the template image and the input image is output from the similarity comparison unit 102A. When the similarity between the template image and the input image is not equal to or greater than the given value, the process returns to step ST11. When the similarity between the template image and the input image is the given value, the process proceed to step ST14.

In step ST14, the feature point matching unit 102B performs the feature point matching between the template image and the input image. Specifically, it is determined whether the number of pairs of feature points included in both the images is equal to or greater than a threshold (for example, six). When the number of pairs of feature points is equal to or greater than the threshold, it is determined that the projection transformation in which the angle of view of the input image is aligned with the angle of view of the template image is possible. When the number of pairs of feature points is less than the threshold, it is determined that the projection transformation is not possible. Then, the process proceeds to step ST15.

In step ST15, the determination result by the feature point matching unit 102B is output. When the number of pairs of feature points is less than the threshold, the process returns to step ST11. When the number of pairs of feature points is equal to or greater than the threshold, the process proceeds to step ST16.

In step ST16, the projection transformation unit 102C performs the projection transformation to project the angle of view of the input image to the same angle of view as the angle of view of the template image. Then, the process proceeds to step ST17.

In step ST17, the region extraction unit 102D can extract the region designated with the setting information, that is, an image of an advertisement portion. Thus, the present target image is obtained. Then, the process proceeds to step ST18.

In step ST18, the feature point matching unit 102B determines the similarity between the present target image and the past target image extracted in the past by the region extraction unit 102D. Then, the process proceeds to step ST19.

In step ST19 a determination result by the feature point matching unit 102B is output to the image classification unit 102E. When the number of pairs of feature points between the present target image and the past target image is equal to or greater than the threshold, that is, the projection transformation is possible, the process proceeds to step ST20. When the number of pairs of feature points between the present target image and the past target image is less than the threshold, that is, the projection transformation is not possible, the process proceeds to step ST21.

In step ST20, since the number of pairs of feature points is equal to or greater than the threshold, there is a past target image similar to the present target image. Accordingly, the image classification unit 102E classifies the present target image into the same category as that of the similar past target image. Then, the process proceeds to step ST22.

In step ST21, since the number of pairs of feature points is less than the threshold, there is no past target image to which the present target image is similar. Accordingly, the image classification unit 102E sets a new category and classifies the present target image to the set category. Then, the process proceeds to step ST22.

In step ST22, as described above, the image extracted by the region extraction unit 102D is classified for each category.

Figure 10:
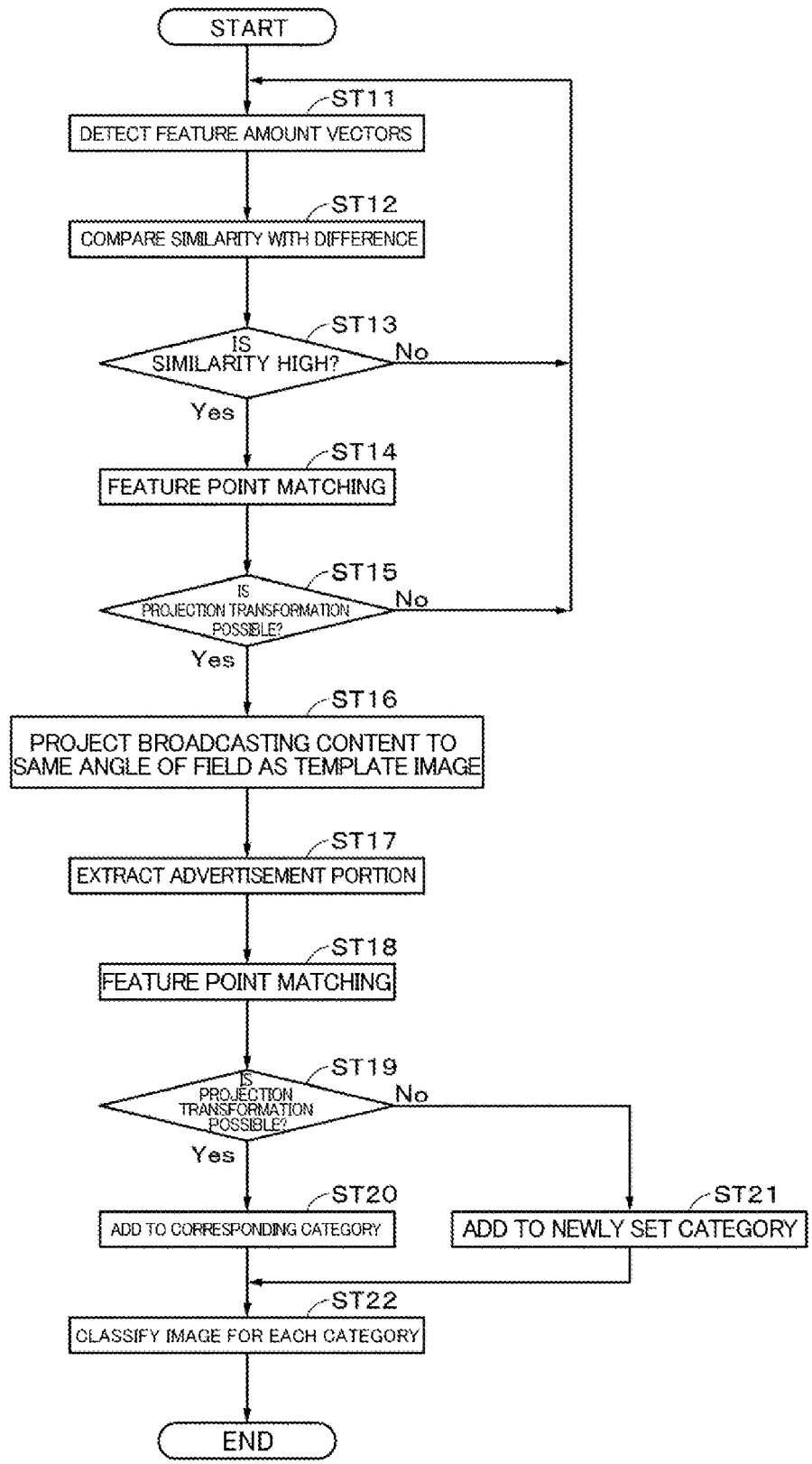
FIG. 10 is a flowchart illustrating an exemplary operation of the information processing device according to the first embodiment.

Although not illustrated in FIG. 10, the process may be further performed by the calculation unit 103. For example, it is assumed that 300 images corresponding to the advertisement 1A are classified into category 1. In an example in which the input image is input every second, the 300 images are displayed for 300 seconds, that is, 5 minutes, as a whole in one piece of baseball content. In this way, since it can be quantified how long a certain advertisement is displayed in one piece of baseball content, a value of an advertisement frame in which the advertisement is displayed can be indicated in a persuasive form for a buyer of the advertisement frame.

Of course, since scenes (angles) included in the baseball content are various in accordance with development of the baseball game, a display time of an advertisement can also be varied. However, since the content of the development of the baseball game is less likely to be changed considerably in every game, the display time of the advertisement is not considerably different. In consideration of this, the calculation unit 103 may calculate an average or the like of the presently calculated display time of the advertisement and a display time of the advertisement calculated in the past.

In the above-described process example, the similarity comparison unit 102A performs the comparison of the similarity in which the feature amount vectors are used, but this process may not be performed. However, by performing the comparison of the similarity using the feature amount vectors in advance, it is possible to lighten a load of a process at the rear stage, and thus it is possible to perform an efficient process as a whole.

When there are a plurality of templates, the above-described series of processes is performed in parallel. The above-described processes may be performed in real time on data of the baseball content during broadcast or delivery or may be temporarily performed on the stored data of the baseball content.

[Example of Display Information Corresponding to Advertisement Detection Result]

The image processing unit 102 may generate display information for visualizing an advertisement detection result. The information processing device 10 may has a configuration in which a display unit is included. The display information generated by the image processing unit 102 may be displayed in the display unit.

Figure 11:
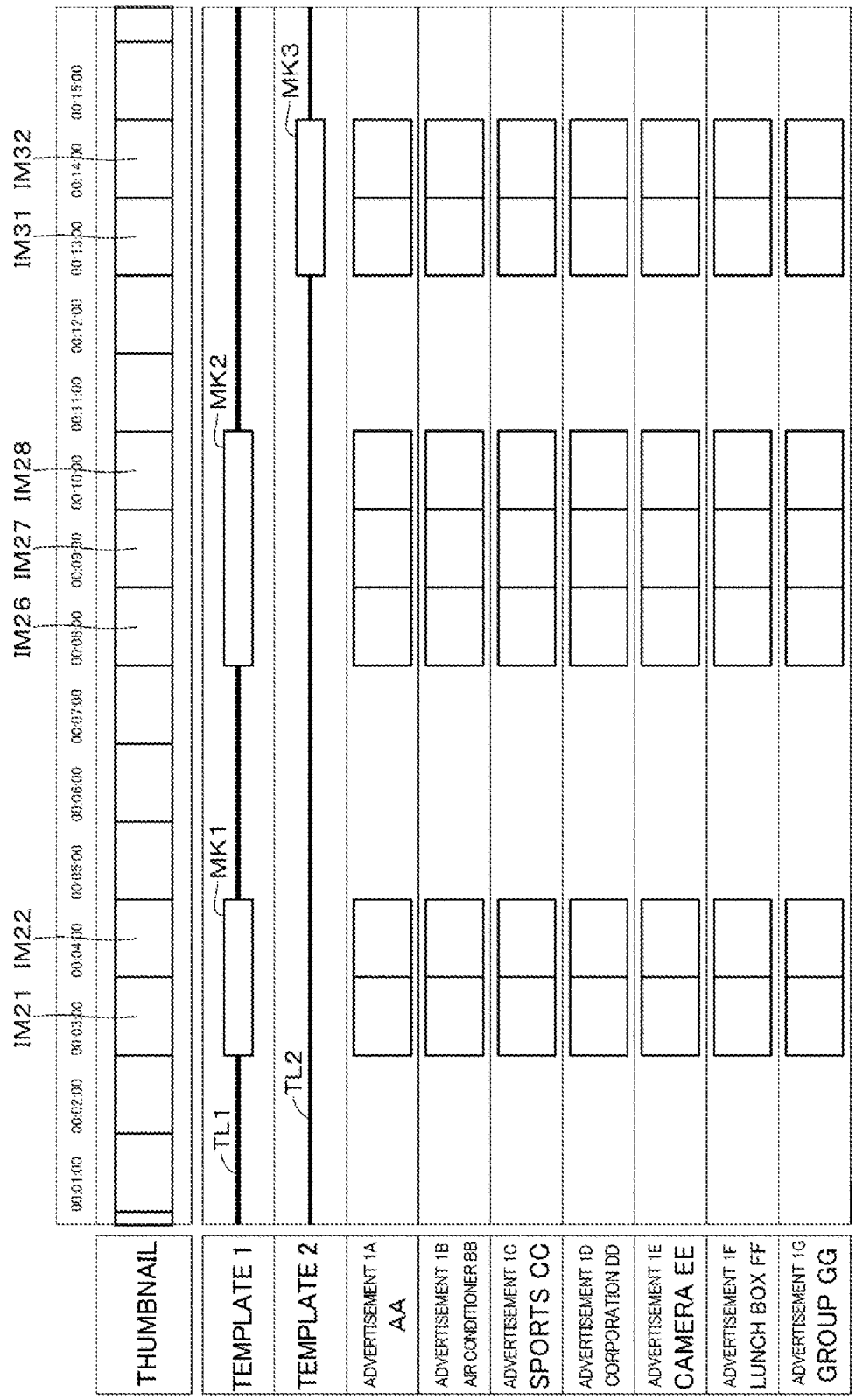
FIG. 11 is a diagram illustrating an example of display corresponding to display information according to the first embodiment.
Figure 12:
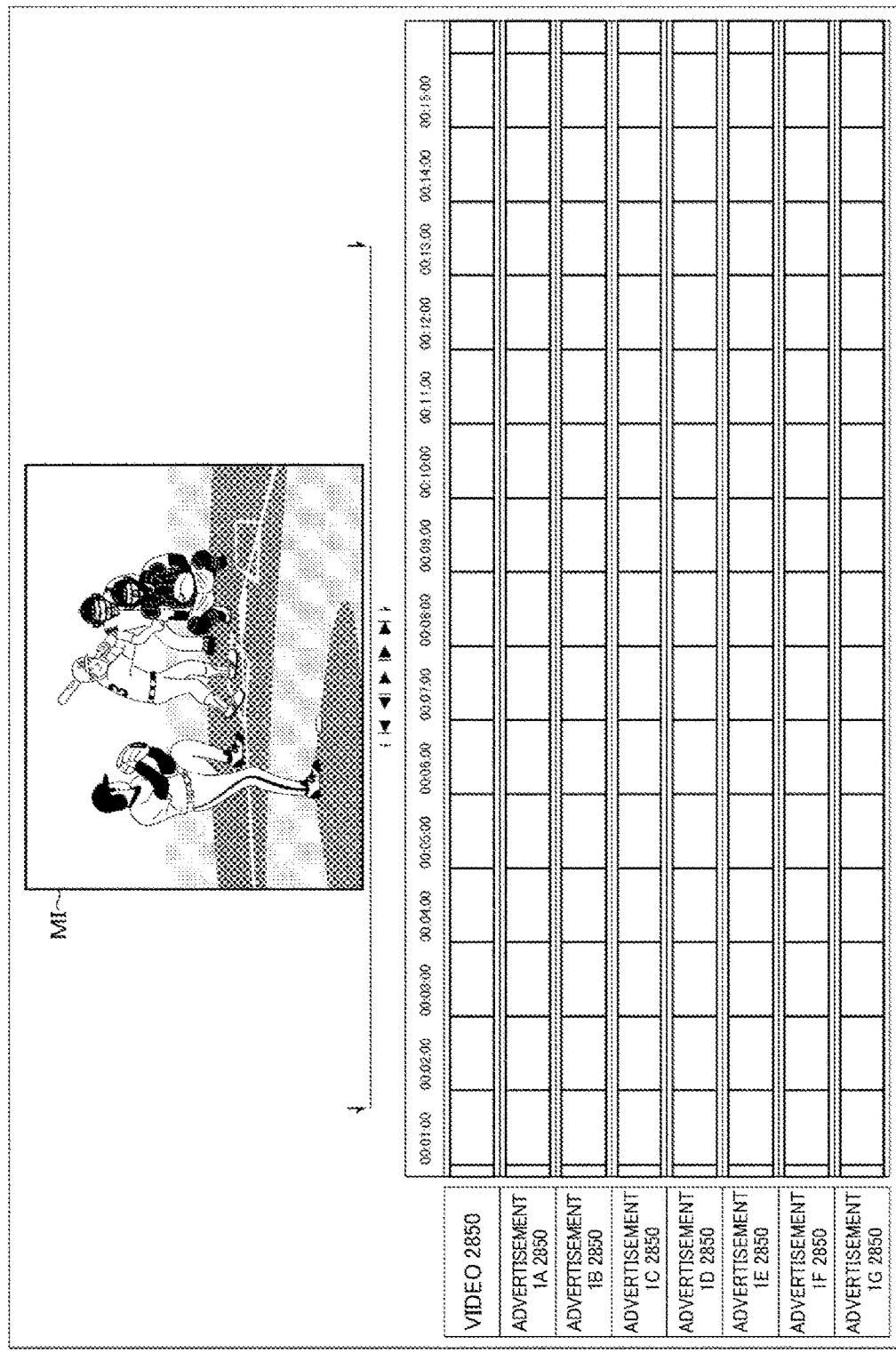
FIG. 12 is a diagram illustrating an example of display corresponding to display information according to the first embodiment.

FIG. 11 illustrates an example of display corresponding to the display information generated by the image processing unit 102. In FIGS. 11 and 12 to be described below, an image is simplified and indicated with a rectangle because of an illustration space.

In the drawing, a thumbnail image corresponding to the input image input every second is displayed to the right of a portion in which "thumbnail" is displayed. The thumbnail image is displayed over time. "Template 1" and "template 2" are displayed below "thumbnail". That is, this example is an example in which two template images, "template 1" and "template 2", are used. A template image corresponding to "template 1" is, for example, the above-described template image TIM. Time axes TL1 and TL2 are displayed to the right of "template 1" and "template 2".

A rectangular mark MK is displayed in a predetermined portion on each time axis. For example, marks MK1 and ML2 are displayed in two portions on the time axis TL1. A mark MK3 is displayed on the time axis TL2. The mark MK means that the input image corresponding to a portion in which the mark MK is displayed is determined to be similar to the template image. For example, the mark MK1 indicates that the similarity comparison unit 102A and the feature point matching unit 102B determines that the input images IM21 and IM22 corresponding to the mark MK1 are similar to the template image corresponding to the template 1. The mark MK2 indicates the similarity comparison unit 102A and the feature point matching unit 102B determines that the input images IM26 to IM28 corresponding to the mark MK2 are similar to the template image corresponding to the template 1. The mark MK3 indicates that the similarity comparison unit 102A and the feature point matching unit 102B determines that the input images IM31 and IM32 corresponding to the mark MK3 are similar to the template image corresponding to the template 2.

"Advertisement 1A" to "advertisement 1G" are displayed in order below "template 2". An image of the advertisement extracted from the input image determined to be similar to the template image corresponding to "template 1" or the template image corresponding to "template 2" is displayed below each mark MK. In FIG. 11, images of "advertisement 1A" to "advertisement 1G" are displayed below the mark MK3, but images of another advertisement are displayed depending on content of the template image corresponding to "template 2" in some cases.

For example, on the time axis TL1, screen content transitions from FIG. 11 to FIG. 12 when an operation of removing a portion in which the template image is not similar to the input image is performed. The display information illustrated in FIG. 12 is also generated by the image processing unit 102. The operation of removing the portion in which the template image is not similar to the input image is, for example, an operation of designating the mark MK1 or MK2.

In FIG. 12, a representative screen MI of the baseball content is displayed. The representative screen MI can be any screen. Text "video", "advertisement 1A", "advertisement 1B", . . . , and "advertisement 1G" are displayed below the representative screen MI. A thumbnail image of the input image determined to be similar to the template image TIM is displayed to the right of "video". An image corresponding to "advertisement 1A" is displayed on the right of "advertisement 1A". The same applies to each of "advertisement 1B" to "advertisement 1G". A sum of times in which the advertisements are detected, that is, a time in which the advertisements are displayed in one piece of baseball content (2850 seconds in the illustrated example), is displayed to the right of the text of "video" and "advertisement 1A" to "advertisement 1G".

For example, when all the display portions of advertisement 1E are hidden by the body of a baseball player, a uniform image is displayed as a thumbnail image. In FIG. 12, to express the categories of the advertisements, the thumbnail is displayed with a colored frame for each category or a category number may be overlaid and displayed.

The above-described information processing device 10 can detect advertisements in accordance with the method in which it is not necessary to perform learning and processing cost is not relatively high.

By using the template image TIM, it is possible to designate a region in advance and further designate content of the analysis process performed on the region. By calculating the display time of the advertisement in one piece of content, it is possible to quantify the value of the advertisement frame in which the advertisement is displayed.

Second Embodiment

Next, a second embodiment will be described. In description of the second embodiment, the same reference numerals are given to the same or homogenous configurations as the above-described configurations and repeated description will be appropriately omitted. The factors described in the first embodiment can be applied to the second embodiment unless otherwise mentioned. For example, the information processing device 10 described in the first embodiment can be applied to an information processing device according to the second embodiment.

Figure 13:
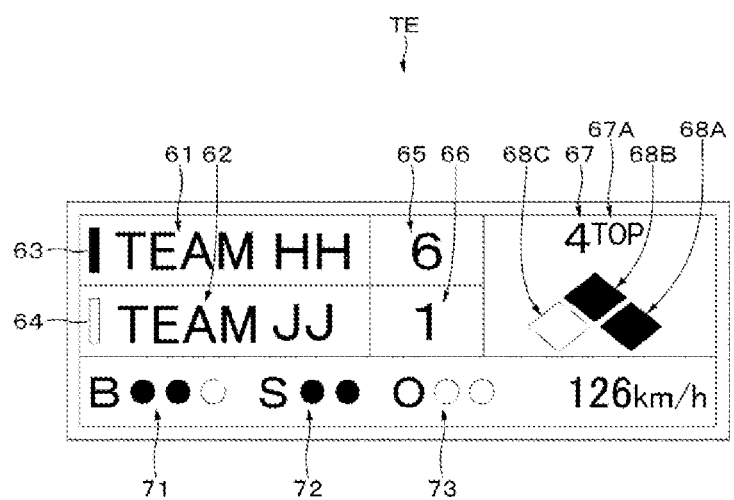
FIG. 13 is a diagram illustrating an example of a telop image according to a second embodiment.

In the first embodiment, the example in which an image of one frame is set as the template image has been described. In the second embodiment, however, a telop image TE illustrated in FIG. 13 is an example of the template image. The telop image is information indicated in accordance with rules of a sports game during the sports game. Of course, a telop image can be displayed for not only a sports game but also the Japanese chess or the game of go.

As illustrated in FIG. 13, in the telop image TE, a team's name 61 ("team HH" as a specific example) and a team's name 62 ("team JJ" as a specific example) are displayed over a span of two vertical stages. A rectangular mark indicating which team is an offensive team is displayed to the left of each team's name. For example, a rectangular mark 63 is displayed to the left of the team's name 61 and a rectangular mark 64 is displayed to the left of the team's name 62. The mark of the offensive team is colored and displayed.

A score 65 which is a score acquired by team HH is displayed to the right of the team's name 61. A score 66 which is a score acquired by team JJ is displayed to the right of the team's name 62. An inning 67, an indication 67A indicating the "top" or "bottom" of the inning 67, and three base marks (a first base mark 68A, a second base mark 68B, and a third base mark 68C) are displayed to the right of the scores 65 and 66. A base mark on which there is a runner is colored and displayed.

A balls number 71 which is the number of counted balls is displayed close to the lower left of the telop image TE. A strikes number 72 which is the number of counted strikes is displayed to the right of the balls number 71. An outs number 73 which is the number of counted outs is displayed to the right of the strikes number 72. Circles of the balls number 71, the strikes number 72, and the outs number 73 are colored and displayed, and the number of counts is displayed.

Figure 14:
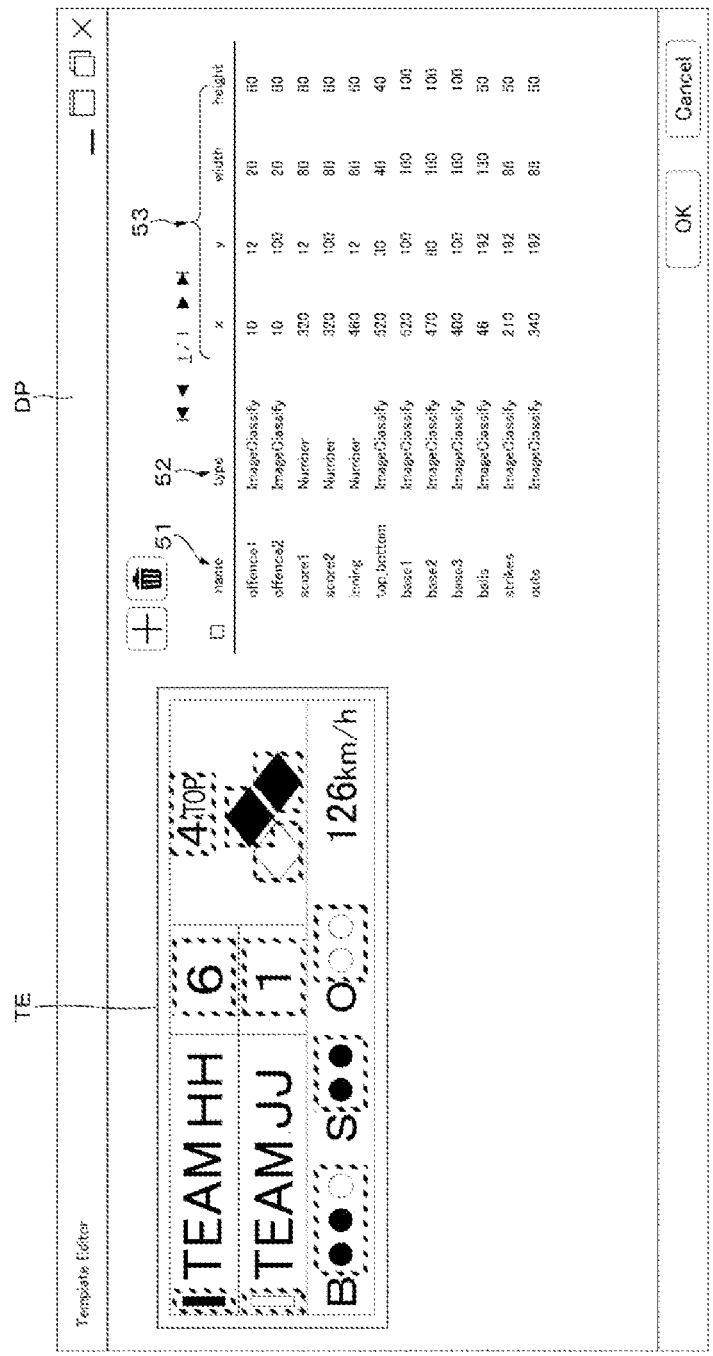
FIG. 14 is a diagram illustrating an example of a UI for inputting setting information using a template image according to the second embodiment.

FIG. 14 is a diagram illustrating an example of a UI for inputting the setting information using the telop image which is a template image. As described above, the setting information may be input by the information processing device 10 or may be input by another device different from the information processing device 10.

As illustrated in FIG. 14, the telop image TE is displayed to the left of the display DP. The setting information is input with reference to the telop image TE. The setting information includes, for example, name information 51, a type 52 corresponding to the analysis process content, and region information 53. The name information 51 is an arbitrarily set term. In this example, twelve pieces of setting information are input based on the telop image TE.

For example, "offence1" is designated as one piece of name information 51. In "offence1", "ImageClassify" is set as the type 52. "ImageClassify" means that the image classification unit 102E is instructed to perform a process as in the first embodiment. As the region information 53 of "offence1", a region in which a region in which a width is "20" and a height is "80", is designated when a portion at an x coordinate of "10" and a y coordinate of "12" in the telop image TE is the origin. The region designated with the region information 53 is a region corresponding to the above-described mark 63.

As once piece of name information 51, "offence2" is designated. In "offence2", "ImageClassify" is associated as the type 52. A region designated with the region information 53 associated with "offence2" is a region corresponding to the above-described mark 64.

"Score1" is designated as one piece of name information 51. In "score1", "Number" is associated as the type 52. "Number" means that the OCR 102F is instructed to perform the text recognition process. A region designated with the region information 53 associated with "score1" is a region corresponding to the above-described score 65.

"Score2" is designated as one piece of name information 51. In "score2", "Number" is associated as the type 52. As described above, "Number" means that the OCR 102F is instructed to perform the text recognition process. A region designated with the region information 53 associated with "score2" is a region corresponding to the above-described score 66.

"Inning" is designated as one piece of name information 51. In "Inning", "Number" is associated as the type 52. A region designated with the region information 53 associated with "inning" is a region corresponding to the above-described inning 67.

"Top_bottom" is designated as one piece of name information 51. "ImageClassify" is associated as the type 52 with "top_bottom". A region designated with the region information 53 associated with "top_bottom" is a region corresponding to an indication 71 of "top" or "bottom" of the above-described inning 67. In the region of "top_bottom", only one of "top" and "bottom" is displayed, and thus the type 52 associated with the region of "top_bottom" may be "Number".

As once piece of name information 51, "base1" is designated. In "base1", "ImageClassify" is associated as the type 52. A region designated with the region information 53 associated with "base1" is a region corresponding to the above-described first base mark 68A.

"Base2" is designated as one piece of name information 51. In "base2", "ImageClassify" is associated as the type 52. A region designated with the region information 53 associated with "base2" is a region corresponding to the above-described second base mark 68B.

"Base3" is designated as one piece of name information 51. In "base3", "ImageClassify" is associated as the type 52. A region designated with the region information 53 associated with "base3" is a region corresponding to the above-described third base mark 68C.

"Balls" is designated as one piece of name information 51. In "balls", "ImageClassify" is associated as the type 52. A region designated with the region information 53 associated with "balls" is a region corresponding to the base number 71.

"Strikes" is designated as one piece of name information 51. In "strikes", "ImageClassify" is associated as the type 52. A region designated with the region information 53 associated with "strikes" is a region corresponding to the above-described strikes number 72.

"Outs" is designated as one piece of name information 51. In "outs", "ImageClassify" is associated as the type 52. A region designated with the region information 53 associated with "outs" is a region corresponding to the above-described outs number 73.

[Exemplary Operation of Information Processing Device]

Figure 15:
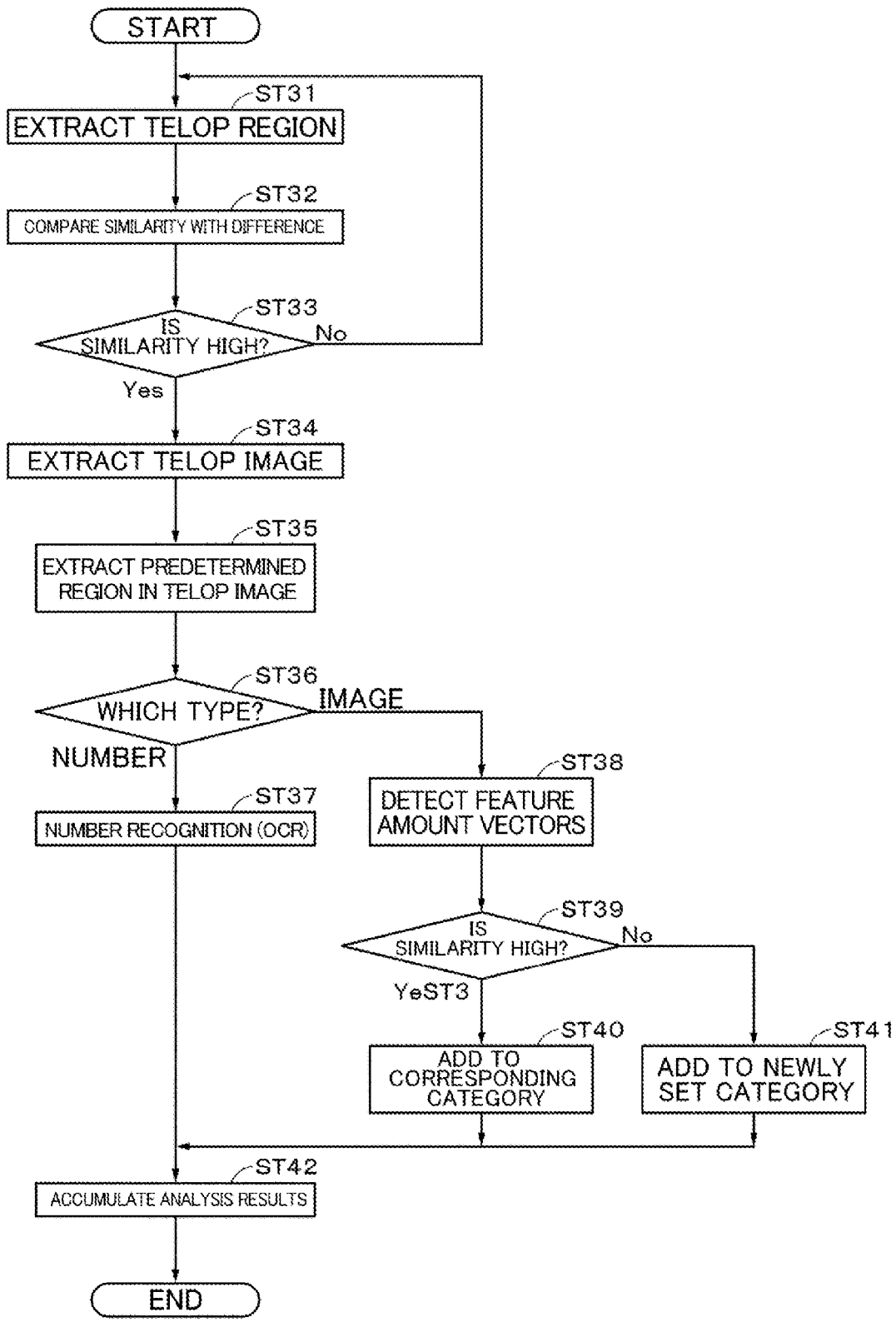
FIG. 15 is a flowchart illustrating an exemplary operation of an information processing device according to the second embodiment.

Next, an exemplary operation according to the second embodiment of the information processing device 10 will be described with reference to the flowchart illustrated in FIG. 15. When the process starts, the image processing unit 102 (for example, the region extraction unit 102D) cuts out an image of the telop region in the input image in step ST31. In general, a region in which the telop image is displayed in determined roughly for each sports game and the portion is designated in advance, so that the image of the telop region can be cut out when the input image is input. Then, the process proceeds to step ST32.

In step ST32, the similarity comparison unit 102A detects feature amount vectors of the telop image TE which is a template image and feature amount vectors of the telop image in the input image. With the difference between both the feature amount vectors, similarity between the telop image TE and the telop image in the input image is determined. As a specific determination method, the determination method described in the first embodiment can be applied. Then, the process proceeds to step ST33.

In step ST33, a determination result of the similarity comparison unit 102A is output. When the similarity between the telop image TE and the telop image in the input image is not equal to or greater than a given value, the process returns to step ST31. When the similarity between the telop image TE and the telop image in the input image is equal to or greater than the given value, the process proceeds to step ST34. That is, the processes of steps ST31 to ST33 are performed to determine whether the telop image is included in the input image.

Figure 16:
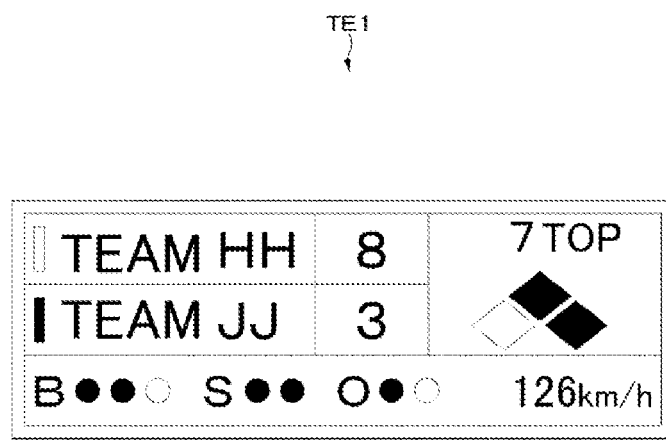
FIG. 16 is a diagram referred to when an exemplary operation of the information processing device is described according to the second embodiment.

In step ST34, the region extraction unit 102D performs a process of extracting the telop image from the input image. Through this process, for example, a telop image TE1 illustrated in FIG. 16 is acquired. Then, the process proceeds to step ST35.

In step ST35, the region extraction unit 102D extracts constituent elements of the telop image TE1 such as a rectangular mark, a score, an inning. Specifically, an image of a region designated with the region information 53 of the above-described setting information is extracted. FIGS. 17A, 17B, 17C, 17D, 17E, 17F, 17G, 17H, 17I, 17J, 17K, and 17L illustrate the extracted image of the constituent elements of the telop image TE1. The image corresponds to a present target image. The image of the constituent elements of the telop image TE1 extracted in the past corresponds to a past target image. Then the process proceeds to step ST36.

In step ST36, the type 52 corresponding to the cut image is determined. When "Number" is designated as the type 52, the image of the constituent elements of the telop image TE1 is supplied to the OCR 102F. Then, the process proceeds to step ST37 and the OCR 102F performs the text recognition process.

When "ImageClassify" is designated as the type 52, the image of the constituent elements of the telop image TE1 is supplied to the similarity comparison unit 102A. Then, the process proceeds to step ST38.

In step ST38, the feature amount vectors of the present target image and the feature amount vectors of the past target image are each detected. Then, the process proceeds to step ST39.

Figure 18:
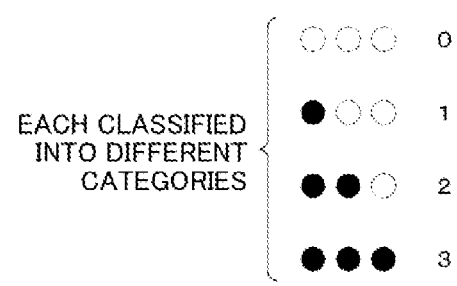
FIG. 18 is a diagram referred to when an exemplary operation of the information processing device is described according to the second embodiment.

In step ST39, the difference between the feature amount vectors of the present target image and the feature amount vectors of the past target image is calculated and the similarity is determined in accordance with the difference. Then, a determination result is output. When the similarity is equal to or greater than the given value, the process proceeds to step ST40 and the image classification unit 102E classifies the present target image into the same category as that of the past target image. When the similarity is not equal to or greater than the given value, the process proceeds to step ST41, and the image classification unit 102E sets a new category and classifies the present target image into the new category. As illustrated in FIG. 18, for example, in the case of the balls number 71, each image is classified into a difference category in accordance with the number of colored display. Then, the process proceeds to step ST42.

In step ST42, an analysis result of each constituent element of the telop image TE1 is accumulated. For example, a result of the text recognition process and a classification result of each category of the image is accumulated chronologically in correspondence with the input image. Then, the process ends.

When a subsequent input image is supplied at a predetermined period (for example, 1 second), the same process is performed.

[Example of Visualization of Analysis Result]

Figure 19:
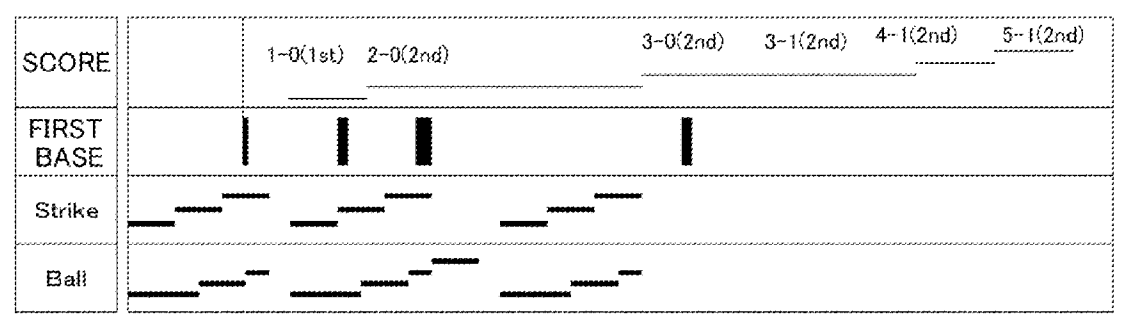

The image processing unit 102 may generate display information for visualizing the analysis result of the telop image. FIG. 19 is a diagram illustrating an example of display corresponding to the display information. For example, since numbers displayed in portions of scores 65 and 66 are accumulated, for example, every second, a change point is detected. Based on the detected change point, as illustrated in FIG. 19, portions in which the scores are changed can be displayed. As illustrated in FIG. 19, based on the classification result obtained by the image classification unit 102E with respect to the image of the balls number 71 or the strikes number 72, the change point can be detected and the detected change point can be displayed. By displaying information illustrated in FIG. 19, it is possible to retrieve, for example, any scene such as a scene in which a score is "3-1 and two strikes" in certain baseball content. For example, by cutting out a predetermined region (for example, a display region of a ball speed) of a record board in a baseball stadium and applying the above-described technology, it is possible to also generate the telop image automatically.

Since the analysis process content can be designated with the setting information, a text recognition process in which relatively processing cost is low can be applied on numbers or text. Thus, the efficiently process can be performed as a whole.

Modification Examples

The embodiments of the present disclosure have been described above, but the present disclosure is not limited to the above-described embodiments and various modifications can be made within the scope of the present disclosure without departing from the gist of the present disclosure.

[Other Application Examples of the Present Disclosure]

Application Example 1

Figure 20:
FIG. 20 is a diagram illustrating a modification example.

The present disclosure can be applied to an image other than a content image of a sports game. For example, the present disclosure can be applied to a commodity stockout management system. An example in which the present disclosure is applied to stockout product management will be described with reference to FIG. 20. In FIG. 20, a dotted line indicates a commodity shelf. An image captured without putting a commodity in advance is stored as a template image and setting information in which a region in which there is each commodity shelf is designated as region information is registered based on the template image. Specifically, in the region of a commodity shelf 75, an image in which nothing is put at first is extracted. Subsequently, when a bread 76 is put on the commodity shelf 75, a new category is set and an image in which the bread 76 is put on the commodity shelf 75 is classified into the category. When the bread 76 is purchased, an image in which nothing is put on the commodity shelf 75 is extracted. This image is classified into the same category as that of a previously captured image in which nothing is put on the commodity shelf 75. A timing at which the image is added to the category is reported to a sales staff by a point of sale system (POS). The sales staff recognizes that the bread 76 becomes out of stock and supplements the bread 76. Of course, the present disclosure can also be applied to stockout management of a commodity other than bread.

Application Example 2

Figure 21:
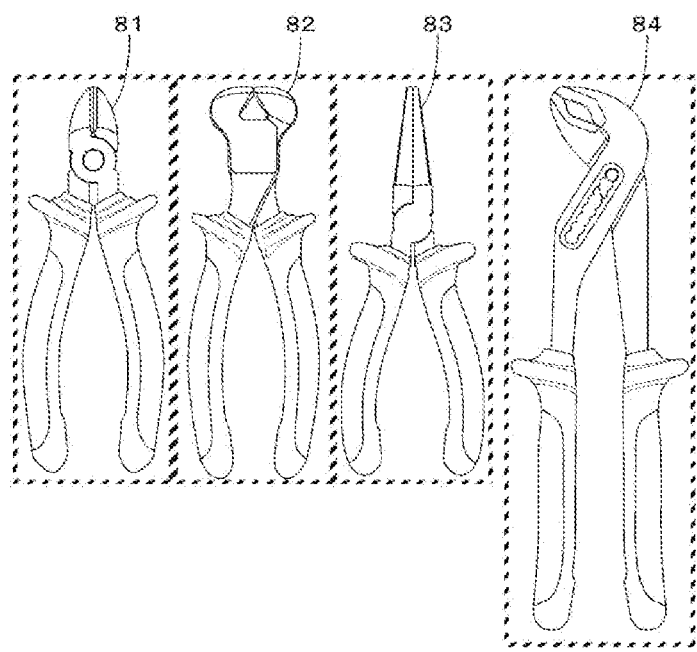
FIG. 21 is a diagram illustrating a modification example.

The present disclosure can also be applied to an article management system. An example in which the present disclosure is applied to the article management system will be described with reference to FIG. 21. As illustrated in FIG. 21, for example, an example is conceivable in which four tools (for example, tools 81 to 84) are suspended on a wall and can be lent. A portion in which each tool is suspended is indicated by a dotted line. At first, a state in which all the tools are arranged is imaged. In the setting information, a region partitioning a storage space of each tool (a region indicated by a dotted line in FIG. 21) is designated.

In this example, to facilitate understanding, the tool 81 will be described as an example. At first, an image in which there is the tool 81 is classified into, for example, ID100. When the tool 81 is lent, the tool 81 disappears. Thus, an image of the storage space of the tool 81, that is, an image in which there is no tool 81, is classified into the newly set category of ID101, for example. When the tool 81 is returned, an image in which there is the tool 81 is added to the category of ID100. For example, when a manager is informed of this timing, the manager can recognize that the tool 81 is returned. If another tool is returned to the storage space of the tool 81, an image including this tool is classified into a category of another newly set ID. In this case, an announcement broadcast such as "A return space of the tool is different" may be reproduced. In this way, the present disclosure can be applied to various systems.

[Other Modification Examples]

Figure 22A:
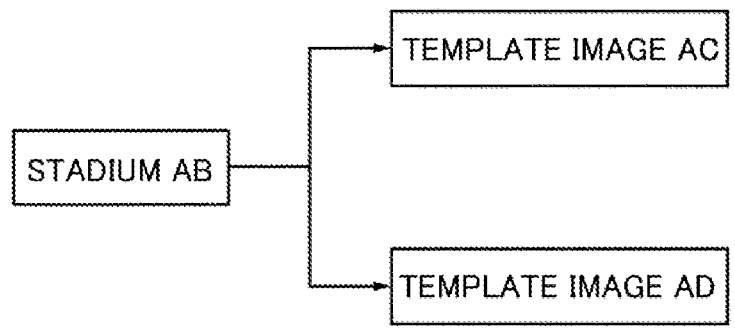
FIGS. 22A and 22B are diagrams illustrating a modification example.
Figure 22B:
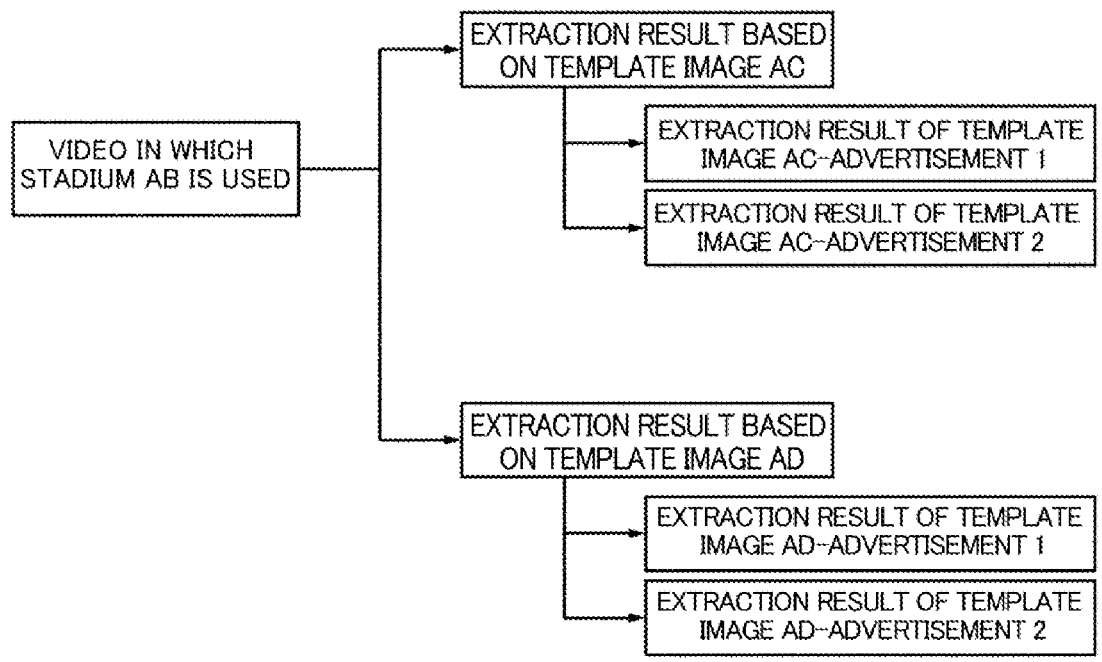

The template image and the setting information based on the template image can also be registered for each stadium for a predetermined sports game. For example, as illustrated in FIG. 22A, two template images (template images AC and AD) and the setting information based on each template image can be registered for a stadium AB. As schematically illustrated in FIG. 22B, extraction results based on the template images AC and AD are obtained for a video in which the stadium AB is used. The stadium may be selected when login is performed in a system that realizes the present disclosure.

Figure 23:
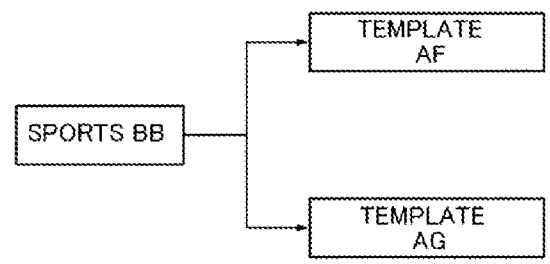
FIG. 23 is a diagram illustrating a modification example.

A template image may be registered for each sports game. For example, as illustrated in FIG. 23, for certain sports BB, two template images (template images AF and AG) and setting information based on each template image can be registered. In this case, the template images AF and AG may be telop images. The sports game may be selected when login is performed in a system that realizes the present disclosure.

The present disclosure can also be realized by a device, a method, a program, a system, or the like. For example, by allowing a program that has the functions described in the above-described embodiments to be downloadable and allowing a device that has no functions described in the embodiments to download and install the program, it is possible to perform the control described in the embodiment in the device. The present disclosure can also be realized by a server that distributes the program. The factors described in the embodiments and the modification examples can be appropriately combined.

The content of the present disclosure is not construed to be limitative by the advantageous effects exemplified in the present disclosure.

The present disclosure can be configured as follows.

(1)

An information processing device including:
an acquisition unit configured to acquire setting information which is set based on a template image and associates an image region with analysis process content; and an image processing unit configured to perform an analysis process corresponding to the analysis process content associated with the image region on an image of a target region corresponding to the image region in an input image.

(2)

The information processing device according to (1), wherein the image processing unit determines whether similarity between the input image and the template image is equal to or greater than a given value and performs the analysis process when the similarity is equal to or greater than the given value.

(3)

The information processing device according to (2), wherein the image processing unit performs a process of classifying the image of the target region for each category as the analysis process.

(4)

The information processing device according to (3), wherein the image of the target region is classified into a predetermined category in accordance with similarity with an image of the target region in a temporally previous input image.

(5)

The information processing device according to (4), wherein, when the image of the target region has similarity equal to or greater than a given value to the image of the target region in the temporally previous input image, the image of the target region is classified into the same category as the image, and when the image of the target region does not have similarity equal to or greater than the given value to the image of the target region in the temporally previous input image, the image of the target region is classified into a newly set category.

(6)

The information processing device according to any one of (3) to (5), further including a calculation unit configured to calculate a display time of an image corresponding to a predetermined category in accordance with a classification result of each category with regard to a plurality of the target regions.

(7)

The information processing device according to any one of (2) to (6), wherein the image processing unit determines whether similarity between the input image and the template image is equal to or greater than a given value by performing a first determination process of determining whether the similarity is equal to or greater than the given value based on a feature amount vector of the input image and a feature amount vector of the template image and performing a second determination process of determining whether the similarity is equal to or greater than the given value based on feature point matching when the similarity is determined to be equal to or greater than the given value as a result of the first determination process.

(8)

The information processing device according to (7), wherein, when the number of feature points of the predetermined image corresponding to feature points of the template image is equal to or greater than a threshold as a result of the second determination process, the image processing unit performs alignment of the template image and the predetermined image and performs an analysis process corresponding to the analysis process content associated with the image region on an image of the target region corresponding to the image region in an aligned image.

(9)

The information processing device according to (8), wherein the threshold is a value in accordance with the number of parameters defining a motion of a camera.

(10)

The information processing device according to any one of (2) to (9), wherein the image processing unit performs a process of recognizing at least one of text and number as the analysis process.

(11)

The information processing device according to any one of (1) to (10), wherein the input image is one frame image or a telop image input at a predetermined period.

(12)

The information processing device according to any one of (1) to (11), wherein the acquisition unit acquires a plurality of pieces of setting information set based on the template image.

(13)

The information processing device according to any one of (1) to (12), wherein the acquisition unit acquires the setting information set in each of a plurality of the template images.

(14)

The information processing device according to any one of (1) to (13), wherein the image processing unit generates display information in which a result of the analysis process is displayed over time.

(15)

The information processing device according to any one of (1) to (14), wherein the image region is a region in which an element configuring an advertisement or a telop is displayed.

(16)

An information processing method including:
acquiring, by an acquisition unit, setting information which is set based on a template image and associates an image region with analysis process content; and
performing, by an image processing unit, an analysis process corresponding to the analysis process content associated with the image region on an image of a target region corresponding to the image region in an input image.

(17)

A program causing a computer to perform an information processing method including;

acquiring, by an acquisition unit, setting information which is set based on a template image and associates an image region with analysis process content; and performing, by an image processing unit, an analysis process corresponding to the analysis process content associated with the image region on an image of a target region corresponding to the image region in an input image.

REFERENCE SIGNS LIST 1A to 1G Advertisement
10 Information processing device
101 Acquisition unit
102 Image processing unit
102A Similarity comparison unit
102B Feature point matching unit
102C Projection transformation unit
102D Region extraction unit
102E Image classification unit
102F OCR
103 Calculation unit
TIM Template image

The invention claimed is:

1. An electronic device, comprising:
circuitry configured to:
acquire setting information, wherein
the setting information is set based on a template image, and
the setting information associates an image region with analysis process content;
determine a similarity between an input image and the template image is equal to or greater than a first threshold value, based on
a first determination process to determine the similarity is equal to or greater than the first threshold value based on a feature amount vector of the input image and a feature amount vector of the template image, and
a second determination process to determine the similarity is equal to or greater than the first threshold value based on feature point matching subsequent to the determination that the similarity is equal to or greater than the first threshold value as a result of the first determination process; and
perform an analysis process based on the determination that the similarity between the input image and the template image is equal to or greater than the first threshold value, wherein the analysis process corresponds to the analysis process content associated with the image region on an image of a target region in the input image-;
generate display information based on a result of the analysis process; and
control display of the display information on a display screen.

2. The electronic device according to claim 1, wherein in the analysis process, the circuitry is further configured to classify the image of the target region for each category.

3. The electronic device according to claim 2, wherein the circuitry is further configured to classify the image of the target region into a specific category based on similarity with a specific image of the target region in a temporally previous input image.

4. The electronic device according to claim 3, wherein based on the image of the target region having the similarity equal to or greater than a second threshold to the specific image of the target region in the temporally previous input image, the image of the target region is classified into a same category as the template image, and based on the image of the target region having the similarity less than the second threshold to the specific image of the target region in the temporally previous input image, the image of the target region is classified into a newly set category.

5. The electronic device according to claim 2, wherein the circuitry is further configured to calculate a display time of an image corresponding to a specific category based on a classification result of each category with regard to a plurality of target regions.

6. The electronic device according to claim 1, wherein based on a number of feature points of the input image corresponding to feature points of the template image being equal to or greater than a second threshold as a result of the second determination process, the circuitry is further configured to:
perform alignment of the template image and the input image, and
perform the analysis process corresponding to the analysis process content associated with the image region on the image of the target region corresponding to the image region in an aligned image.

7. The electronic device according to claim 6, wherein the second threshold is a value based on a number of parameters defining a motion of a camera.

8. The electronic device according to claim 1, wherein the analysis process is a process of recognizing at least one of text and number.

9. The electronic device according to claim 1, wherein the input image is one of a frame image or a telop image input at a specific period.

10. The electronic device according to claim 1, wherein the circuitry is further configured to acquire a plurality of pieces of the setting information set based on the template image.

11. The electronic device according to claim 1, wherein the circuitry is further configured to acquire the setting information set in each of a plurality of template images.

12. The electronic device according to claim 1, wherein the image region is a region in which an element configuring an advertisement or a telop is displayed.

13. An information processing method, comprising:
acquiring, by circuitry, setting information, wherein
the setting information is set based on a template image, and
the setting information associates an image region with analysis process content;
determining, by the circuitry, a similarity between an input image and the template image is equal to or greater than a first threshold value, based on
a first determination process to determine the similarity is equal to or greater than the first threshold value based on a feature amount vector of the input image and a feature amount vector of the template image, and
a second determination process to determine whether the similarity is equal to or greater than the first threshold value based on feature point matching subsequent to the determination that the similarity is equal to or greater than the first threshold value as a result of the first determination process; and
performing, by the circuitry, an analysis process based on the determination that the similarity between the input image and the template image is equal to or greater than the first threshold value, wherein the analysis process corresponds to the analysis process content associated with the image region on an image of a target region in the input image;

generating, by the circuitry, display information based on a result of the analysis; and controlling display of the display information on a display screen.

14. A non-transitory computer-readable medium having stored thereon computer executable instructions, which when executed by one or more processors, cause the one or more processors to execute operations comprising:

acquiring setting information, wherein
the setting information is set based on a template image, and
the setting information associates an image region with analysis process content;

determining a similarity between an input image and the template image is equal to or greater than a first threshold value, based on
a first determination process to determine the similarity is equal to or greater than the first threshold value based on a feature amount vector of the input image and a feature amount vector of the template image, and
a second determination process to determine whether the similarity is equal to or greater than the first threshold value based on feature point matching subsequent to the determination that the similarity is equal to or greater than the first threshold value as a result of the first determination process; and performing an analysis process based on the determination that the similarity between the input image and the template image is equal to or greater than the first threshold value, wherein the analysis process corresponds to the analysis process content associated with the image region on an image of a target region in the input image;

generating display information based on a result of the analysis process; and controlling display of the display information on a display screen.

* * * * *